UNITED STATES PATENT OFFICE.

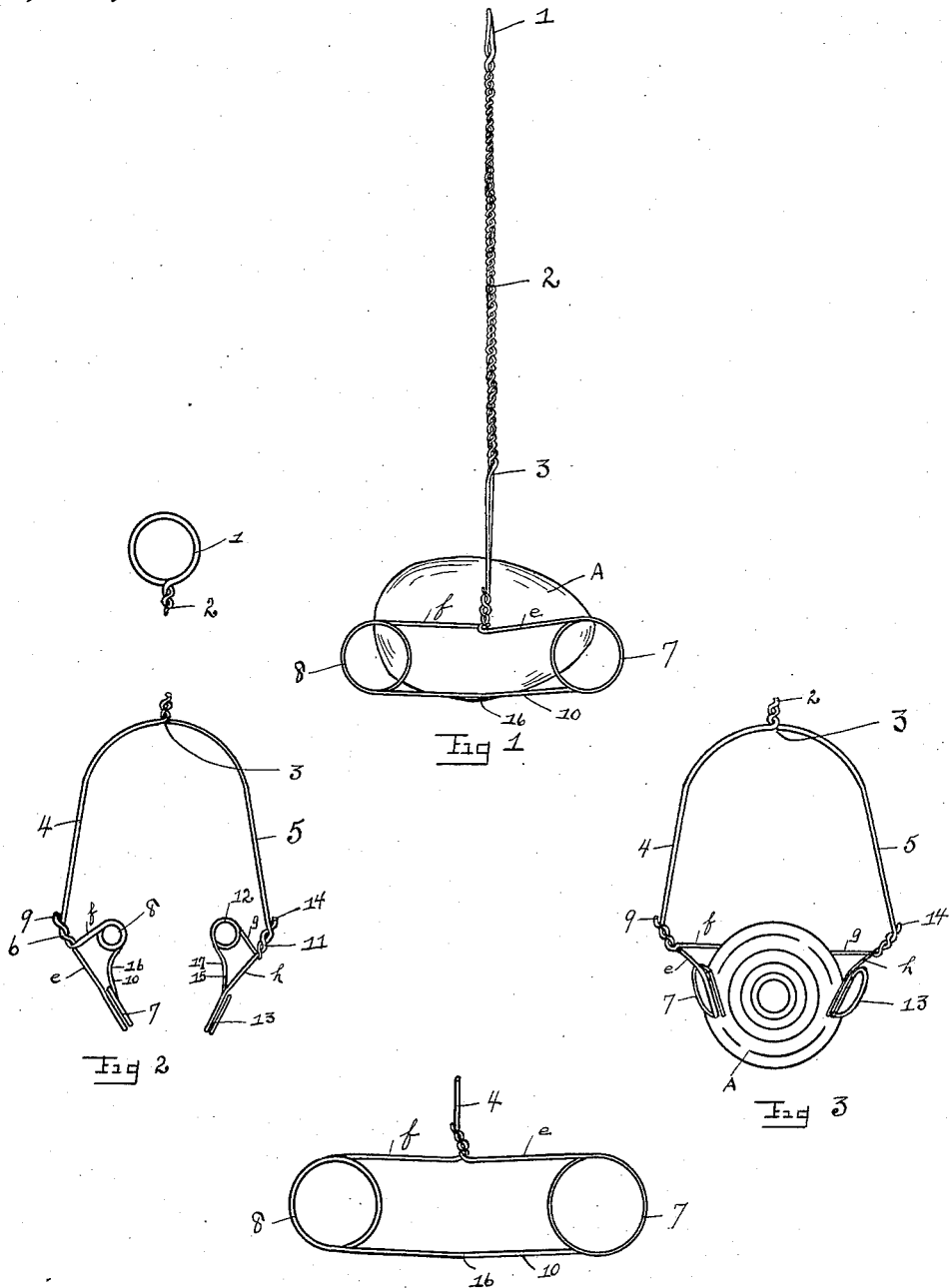

PATRICK H. DUNN, OF ROME, NEW YORK, ASSIGNOR TO ERNEST C. HALL, OF EAST BRANCH, NEW YORK.

EGG-LIFTER.

1,054,638.  Specification of Letters Patent.  Patented Feb. 25, 1913.

Application filed May 14, 1910. Serial No. 561,304.

*To all whom it may concern:*

Be it known that I, PATRICK H. DUNN, a citizen of the United States, residing at Rome, in the county of Oneida and State of New York, have invented certain new and useful Improvements in Egg-Lifters, of which the following is a specification, reference being had therein to the accompanying drawing.

My invention relates to an egg lifter and I declare the following to be a full, clear, concise and exact description thereof, sufficient to enable any one skilled in the art to which it apertains to make and use the same reference being had to the accompanying drawings in which like reference characters refer to like parts throughout.

The object of the invention is to provide a cheap household article that may be used in lifting eggs out from boiling water in kettles or other receptacles. The invention accomplishes this object by spring mechanism.

Although I have here specified a particular object there are various other objects which will appear by reference to the drawings in which:

Figure 1 is a side elevation of the device holding an egg; Fig. 2 is a fragmentary perspective view; Fig. 3 is a fragmentary end elevation showing the device about to grasp an egg; Fig. 4 is an enlarged side elevation of the lower or basket portion of the device.

Referring more particularly to the drawings, the preferred construction of my device contemplates a single piece of wire bent double and formed in the manner following; the middle portion of the wire is bent into a ring or eye 1. Below said ring 1 the wire is twisted upon itself for a suitable length to form a handle 2 below which it is bifurcated as at 3 into jaws 4 and 5, as shown clearly in Figs. 2 and 3, so as to form spring mechanism for a bottomless basket which I shall now describe. Following the course of prong 4 the wire is twisted as at 6 and bent inwardly, then leads off at approximately right angles for a distance, bends into a circle 7, thence to circle 8, thence back to prong 4 where it is twisted about the inwardly bent portion of same and terminated as at 9. The portion 10 between circles 7 and 8 is bent outwardly to a slight degree as at 16 to conform to the outline of the surface of an egg A and is substantially in a parallel plane to portions $e$ and $f$. Likewise prong 5 is twisted as at 11 and bent inwardly, thence leads off at approximately right angles a distance to circle 12, thence to circle 13, to prong 5 and there twisted about same and terminated as at 14. The portion 15 between circles 12 and 13 is likewise bent outwardly as at 17 to conform to the outline of the surface of the egg and is substantially in a parallel plane to portions $g$ and $h$.

To operate the device it is simply necessary to grip the handle 2 in any convenient manner and press downward on same, so that the lower or basket portion of the device will contact with the surface of an egg and the bifurcated prongs 4 and 5 yield sufficiently to permit the portions 10 and 15 of the wire to ride over the surface of the egg and cause it to rise up into the basket after parts 10 and 15 have passed below the center of gravity of the egg. The egg once in the basket portion is held there until removed by the hand of the operator or removed by tipping the device.

Ring 1 may serve both as a place to insert a finger and as a means to hang up the device when not in use.

Having thus described my invention what I claim as new and desire to secure by Letters Patent is:

1. In an egg lifter, a wire bent double, a portion of said doubled part twisted to form a ring and a handle, said wire bifurcated below said handle, jaws formed at the ends of said bifurcated wire, and spring means whereby pressure on said handle will cause said jaws to automatically separate to receive an egg and to close again in an automatic manner to hold said eggs so received 2. In an egg lifter, a wire bent double and twisted upon itself whereby to form an eye and a handle, jaws formed at the free ends of said wire, spring means for automatically opening and closing said jaws, whereby to receive and hold an egg, and said jaws having an open space at the top thereof whereby said egg may be rolled out therefrom by tipping the device.

In testimony whereof I have hereunto affixed my signature in the presence of two witnesses.

PATRICK H. DUNN.

Witnesses:
H. M. CLARK,
T. L. WILDER.

Copies of this patent may be obtained for five cents each, by addressing the "Commissioner of Patents. Washington, D. C."